3,523,812
MODIFIED FURNACE CARBON BLACK
Gerard Kraus, Bartlesville, Okla., assignor to Phillips Petroleum Company, a corporation of Delaware
Continuation of application Ser. No. 405,773, Oct. 22, 1964. This application June 6, 1968, Ser. No. 736,546
Int. Cl. C09c 1/58
U.S. Cl. 106—307                      8 Claims

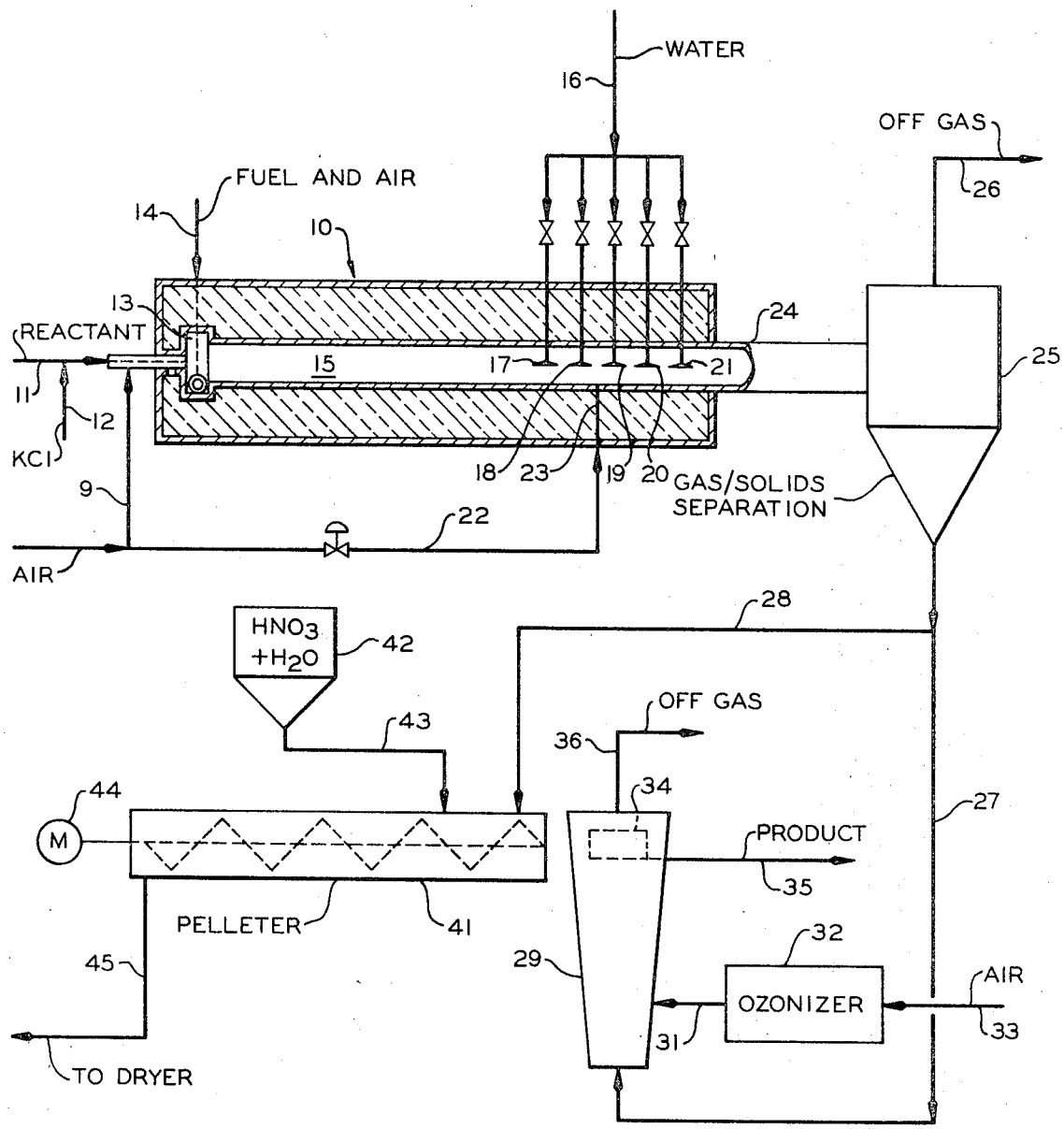

ABSTRACT OF THE DISCLOSURE

A modified furnace black which can be substituted for channel black in a rubber compounding recipe is produced by forming carbon black in a carbon black furnace in the presence of an alkali metal; maintaining the carbon black in the presence of the combustion gases in the furnace, prior to the quench, for a time sufficient to increase the surface area of the black about 15 to 40 square meters per gram higher than the surface area of the black at a photelometer of 90; cooling the black to a temperature of about 200° F. or lower; and then treating the black with an oxidizing agent such as nitric acid, ozone, or oxides of nitrogen.

---

This is a continuation of application Ser. No. 405,773, filed Oct. 22, 1964, now abandoned.

This invention relates to a modified oil furnace carbon black and to a method for its production. This invention further relates to a simulated channel carbon black or an oil furnace carbon black which can be substituted for channel carbon black. In one aspect this invention relates to an oil furnace carbon black which can be substituted successfully for channel carbon black in the compounding of rubber and a method for its production. In another aspect the invention relates to an oil furnace carbon black which can be substituted for channel carbon black as a pigment, for example, in the manufacture of ink. In still another aspect this invention relates to a method for producing oil furnace carbon black having lower than normal pH values, higher than normal surface area values, higher than normal percentage of volatile materials, and lower than normal values of oil absorption properties than those of conventional furnace carbon blacks of comparable grade.

In recent years carbon black has been produced in large quantities in carbon black producing furnaces using oil feed stock. Prior to the advent of the oil furnace carbon blacks, the major portion of the carbon black was produced by the channel process. The larger part of the carbon black produced today is used as a reinforcing agent for rubber. By far the larger part of the compounded rubber material containing carbon black is designed specifically for tire treads or tire carcasses.

Despite the widespread and increasing use of oil furnace blacks in applications formerly served by channel black, there are some uses for which channel blacks are still regarded as superior by some persons skilled in the art for example, in tires for heavy duty off-the-road service and other specific applications. Some users prefer channel black because they have standardized on recipes originated with channel black and they do not choose to change the recipes to conform to those properties of furnace black which are different from the properties of channel black. It is therefore desirable to furnish the art with a furnace black exhibiting properties in rubber sufficiently comparable to those provided by channel black that the furnace black can be substituted for channel black in an existing rubber compounding recipe. This is particularly true because channel blacks are increasing in costs as a result of the increasing costs of the raw gas materials from which they are made and as a result of the inefficiency of the channel black process.

Broadly, the present invention contemplates the modification of furnace black to provide a substitute for channel black by producing carbon black in a carbon black furnace in the presence of an alkali metal; maintaining the carbon black in the presence of the combustion gases in the furnace, prior to the quench, for a time sufficient to raise the photelometer of the quenched (prior to pelleting) black to 100 or to increase the surface area of the black about 20 to 30 square meters per gram higher than the surface area of the black produced at a photelometer of about 90 on the quenched black; cooling the black to a temperature of about 200° F. or lower; and then treating the black with an oxidizing agent such as nitric acid, ozone, or oxides of nitrogen. Additional air can be introduced to the furnace upstream from the quench if it is desired to increase the surface area of the carbon black produced. Although the invention can be practiced in the production of Fast Extrusion Furnace (FEF) Black; Intermediate Super Abrasion Furnace (ISAF) Black; or Super Abrasion Furnace (SAF) Black, the principal utility of the invention will be in the modification of High Abrasion Furnace (HAF) Black.

A furnace carbon black that has been found particularly suitable for the production of HAF black is disclosed and described in U.S. Pat. 3,009,784, issued Nov. 21, 1961, to J. C. Krejci. In column 2, line 43, to column 3, line 12, of this patent the significance of "photelometer" is explained and the method for determining the photelometer of a carbon black is described. Also in the above patent an adjustable quench is described and illustrated whereby the residence time in the furnace can be adjusted to provide the desired photelometer and/or surface area values of the carbon black produced.

It is an object of this invention to produce a furnace carbon black that can be satisfactorily substituted for channel carbon black in a rubber compounding recipe. It is also an object of this invention to produce a carbon black that is satisfactory for use as a pigment in the manufacture of ink and paint. Still another object of this invention is to provide a method for modifying the properties of surface chemistry and structure of a furnace black so as to simulate those of channel carbon black. Yet another object of the invention is to provide a method for producing a carbon black which, when compounded in a rubber compound, will reduce the modulus property of the rubber and will increase the values of scorch time, volatile matter and oxygen in the compounded rubber as compared to a conventional oil furnace black. Other and further objects and advantages of this invention will be apparent to those skilled in the art upon reading this disclosure including the detailed description of the invention and the drawing wherein:

The sole figure of the drawing is a schematic flow diagram of a preferred embodiment of the process.

One channel carbon black which is particularly suitable as a reinforcing agent in rubber is generally designated as Easy Processing Channel Black (EPC). Oil furnace carbon blacks are inherently easy processing and therefore this property does not require modification in producing a channel black substitute. Channel blacks are generally characterized by a pH value below 7 and often about 3 or 4 whereas furnace blacks are characterized by a relatively higher pH value, often higher than 7, for example about 8 or 9. The lower pH value of the channel black is believed to be the result of acidic groups attached to or combined with the surface of the carbon black particle and this property is believed to impart a "built-in" vulcanization retarding agent which operates to prevent scorch or premature vulcanization of the rubber in which the carbon black is incorporated. It is therefore necessary to reduce the pH value or to increase the acidity of the oil furnace carbon black in order to simulate channel black. It is believed more nearly accurate to say that it is necessary to attach some acidic groups to the furnace black particle to overcome the scorch tendencies of the furnace blacks. Measuring the pH of the treated oil furnace black is a simple and rapid method for estimating the amount of acidic groups attached to the furnace black particles. The amount of diphenylguanidine absorbed by the oil furnace black is another and more preferred method of measuring the acidic groups attached to the carbon black particles, e.g., an indication of the surface chemistry of the particles.

Another important property of furnace blacks in the compounding of rubber is the effect of the black on the modulus of the rubber. Furnace carbon blacks generally impart higher modulus values to the rubber in which these blacks are compounded than do channel blacks and therefore it is necessary to modify a furnace black that is to be used as a substitute for channel black to lower the modulus of the rubber in which the black is incorporated. There is a close correlation between the structure of a carbon black and the modulus of a rubber product compounded with such black and it has been found that carbon black produced in the presence of an alkali metal has lower than normal properties of structure and produces a rubber product having lower than normal modulus values. Since it is not convenient to measure the structure directly, the oil absorption properties of the black are commonly used as a measure of the structure of the black. It has been found that the oil absorption value of the carbon black usually correlates closely with the modulus of a rubber having the carbon black compounded therein. Alkali metals having an atomic number of at least 19 are particularly effective in lowering the structure property of furnace black and potassium is usually preferred because of its availability and beneficial effect. The alkali metal is added to the oil in an amount in the range of about 2 to 10,000 parts per million parts of oil by weight. An aqueous solution of KCl is usually added to the oil prior to introduction of the oil to the carbon black furnace.

In the drawing, which is a schematic flow diagram of one embodiment of the process, conventional items of equipment are employed and it will be understood by those skilled in the art that various auxiliary items including valves, pumps, gauges, and the like, have been omitted but that those skilled in the art will readily appreciate the requirement of such incidental auxiliary equipment.

Referring now to the drawing, reactant hydrocarbon is introduced to reactor 10 via conduit 11 along with an alkali metal compound, for example, potassium chloride, via conduit 12. Air is introduced along with reactant hydrocarbon via conduit 9. Fuel and air are introduced to the tangential precombustion chamber 13 via conduit 14. The reactants and reaction products pass through the reactor section 15 and the reaction, including aftertreatment, is quenched by water admitted via conduit 16 and one or more of spray nozzles 17, 18, 19, 20 and 21. If desired, air can be admitted to reaction chamber 15 via conduit 22 and inlet 23. Reactor effluent including carbon black and combustion products passes through conduit 24 to gas/solids separation apparatus 25 which can be any conventional means for separating carbon black from the smoke in which it is contained such as filter bags, cyclone separators, electrical precipitators or combinations of these. Off-gas is removed via conduit 26. Carbon black removed from separator 25 is passed via conduit 27 for treatment with ozone or is passed through conduit 28 for treatment with nitric acid. In the ozone treatment the carbon black is passed into contactor 29 wherein a fluidized bed of carbon black is maintained with ozonized air being utilized as the fluidizing agent introduced via conduit 31 from ozonizer 32 to which air is passed via conduit 33. Contactor 29 is also used when treating with oxides of nitrogen. Carbon black product is collected in collecting pan 34 and removed via conduit 35. Off-gas is removed via conduit 36.

Carbon black treated with nitric acid is passed through conduit 28 to pelleter 41 along with pelleting liquid which comprises an aqueous solution of nitric acid introduced from storage vessel 42 and conduit 43. The pelleter 41 is actuated by power source such as motor 44. The wet pellets are removed from pelleter 41 via conduit 45 and passed to a dryer (not shown).

The invention may be more readily understood by reference to the following examples which represent specific embodiments of the invention. It should be understood, however, that these specific embodiments of the invention are illustrative and should not be construed as limiting the invention unduly.

EXAMPLE I

In all of the runs of the examples the furnace carbon blacks were made from an aromatic oil feedstock in a tangential-flame, precombustion type furnace utilized in the production of HAF blacks. Aftertreating was accomplished by moving the quench downstream until the photelometer of the quenched black was about 100 on samples removed from conduit 24 of the figure.

In the following Table I some important properties of the carbon blacks of the invention (blacks 5, 6 and 7), are compared with those of other carbon blacks.

TABLE I.—CARBON BLACK PROPERTIES

| Carbon black [1] | 1 | 2 | 3 | 4 | 5 | 6 | 7 | 8 |
|---|---|---|---|---|---|---|---|---|
| Surface area, m.$^2$/g.[2] | 85 | 77 | 80 | 121 | 121 | 121 | 84 | 114 |
| Oil absorption, cc./g.[3] | 1.25 | 0.91 | 0.80 | 0.97 | 0.95 | 0.96 | 0.93 | 0.97 |
| DPG absorption, micro eq./g.[4] | 19.6 | 15.3 | 49.7 | 14.4 | 62.2 | 65.4 | 60 | 41.3 |
| pH [5] | 8.8 | 7.3 | 2.8 | 7.1 | 2.2 | 2.7 | 2.5 | 4.0 |
| Volatile matter, wt. percent [6] | 2.0 | 1.24 | 2.61 | 0.69 | 2.39 | 1.32 | 2.5 | 4.59 |

[1] (1) HAF black (High Abrasion Furnace). (2) HAF black with 130 p.p.m. KCl in feed. (3) Black of 2 treated with 5 wt. percent nitric acid (HNO$^3$). (4) HAF black with 262 p.p.m. KCl in feed; aftertreated with air added to furnace. (5) Black of 4 treated with 5 wt. percent nitric acid. (6) Black of 4 treated with 1.7 lbs. ozone/100 lbs. black at ambient temperature. (7) HAF black with 200 p.p.m. KCl in feed; aftertreated with no added air; treated with 5.5 wt. percent HNO$^3$. (8) EPC black (Easy Processing Channel).
[2] Low-temperature nitrogen adsorption (BET Method).
[3] ASTM D 281–31.
[4] ASTM D 1512–60.
[5] Number of microequivalents of diphenylguanidine (DPG) adsorbed by 1 gram of black, determined by back-titration of the benzene solution of DPG with standard methanolic HCl, using tetrabromophenyl-sulfonephthalein indicator.
[6] Percentage weight loss of dried samples of black after 7 minutes at 950±20° C. in the absence of air.

EXAMPLE II

Carbon blacks 1, 2, 3 and 5 were compounded in a natural rubber recipe, cured 30 minutes at the indicated temperature and tested.

The compounding recipe used is shown in Table II and the test results are shown in Table III.

TABLE II.—NATURAL RUBBER RECIPE

| | Parts by weight |
|---|---|
| #1 smoked sheet | 100 |
| Carbon black | 45 |
| Zinc oxide | 3 |
| Stearic acid | 3 |
| Flexamine [1] | 1 |
| Flexzone 3C [2] | 2 |
| Philrich 5 [3] | 5 |
| Vultrol [4] | 1 |
| Sulfur | 2.25 |
| NOBS special [5] | 0.7 |

[1] A physical mixture of a complex diarylamine-ketone reaction product (65%) and N,N'-diphenyl-p-phenylenediamine (35%).
[2] N-isopropyl-N'-phenyl-p-phenylenediamine.
[3] A highly aromatic extender oil.
[4] N-nitrosodiphenylamine.
[5] N-oxydiethylene-2-benzothiazyl sulfenamide.

TABLE III.—RUBBER PROPERTIES (NATURAL RUBBER)

| Carbon black | 1 | 2 | 3 | 5 |
|---|---|---|---|---|
| Processing properties: | | | | |
| Compound: | | | | |
| ML-4 [2] | 160.0 | 39.2 | 53.2 | 54.3 |
| MS-1½ [3] | 33.3 | | 129.6 | 130.2 |
| Scorch, min. [4]: | | | | |
| 250° F | 26.5 | 23.2 | 25.0 | 26.6 |
| 280° F | 9.4 | 8.6 | 9.0 | 9.6 |
| Extrusion at 250° F. [5]: | | | | |
| Inches/minute | 41.7 | | 43.0 | 40.5 |
| Grams/minute | 99.7 | | 80.0 | 79.0 |
| Rating (Garvey die) | 11+ | | 9 | 10— |
| Physical properites—cured 30 min | 307° F. | 293° F. | 307°F. | 307° F. |
| Compression set, percent [6] | 19.2 | 26.6 | 28.5 | 31.5 |
| 300% modulus, p.s.i., 80° F. [7] | 1,910 | 1,495 | 1,390 | 1,230 |
| Tensile, p.s.i., 80° F. [7] | 4,300 | 4,335 | 4,360 | 4,220 |
| Elongation, percent, 80° F. [7] | 560 | 600 | 625 | 630 |
| Max. tensile, p.s.i. 200° F. [7] | 2,930 | 2,680 | 2,540 | 2,570 |
| ΔT, °F. [8] | 35.6 | 37.3 | 32.6 | 37.7 |
| Resilience, percent [9] | 72.2 | 75.6 | 79.2 | 76.0 |
| Shore A hardness [10] | 64.0 | 59 | 59.5 | 58.5 |

[1] Calculated values.
[2] ASTM D 1646-61, Mooney Viscometer, large rotor, 4 minutes, 212° F. Starred values are calculated from the relation ML-4=1.8 MS-1½.
[3] ASTM D 1646-61, Mooney Viscometer, small rotor, 1½ minutes, 212° F. Starred values are calculated as in footnote [2].
[4] ASTM D 1646-61, Mooney Viscometer, large rotor. Scorch is time in minutes to 5-point rise above minimum Mooney.
[5] Ind. Eng. Chem. 34, 1309 (1942). A No. ½ Royle Extruder is used with a Garvey die. The rating is based on 12 for a perfectly-formed extruded product, with the lower numbers indicating less nearly perfect products.
[6] ASTM D 395-61, Method B (modified). Compression devices are used with 0.325-inch spacers to give a static compression for the 0.5-inch pellet of 35 percent. Test is run for 2 hours at 212° F., plus relaxation for 1 hour at 212° F.
[7] ASTM D 412-61T. Scoott Tensile Machine L-6.
[8] ASTM D 623-58, Method A, Goodrich Flexometer, 143 lbs./sq. in. load, 0.175-inch stroke. Test specimen is a right circular cylinder 0.7 inch in diameter and 1 inch high.
[9] ASTM D 945-59 (modified). Yerzley oscillograph. Test specimen is same as in [8].
[10] ASTM D 676-59T.

The data of Table IIII show the lower modulus value of the rubber having incorporateed therein carbon black according to the invention.

EXAMPLE III

Carbon blacks 1, 4 and 5 were compounded in a natural rubber recipe, cured for 30 minutes at 293° F. and tested. The compounding recipe used is shown in Table IV and the test results are shown in Table V.

TABLE IV.—NATURAL RUBBER RECIPE

| | Parts by weight |
|---|---|
| #1 smoked sheet | 100 |
| Carbon black | 50 |
| Stearic acid | 3 |
| Zinc oxide | 5 |
| Altax [1] | 0.6 |
| Sulfur | 2.5 |

[1] 2,2'-dibenzothiazyl disulfide.

TABLE V.—RUBBER PROPERTIES (NATURAL RUBBER)

| Carbon black | 1 | 4 | 5 |
|---|---|---|---|
| Processing properties: Compounded ML-4 | 92.0 | 78.0 | 87.0 |
| Physical properties (cured 30 minutes at 293° F.): | | | |
| 300% modulus, p.s.i., 80° F | 2,250 | 1,715 | 1,400 |
| Tensile, p.s.i., 80° F | 3,880 | 4,130 | 3,610 |
| Elongation, percent, 80° F | 470 | 550 | 560 |

The data of Table V show the considerably lower modulus obtained by nitric acid treatment of the aftertreated black made in the presence of the alkali metal.

EXAMPLE IV

Carbon blacks 1, 4 and 5 were compounded in an emulsion-polymerized butadiene-styrene synthetic rubber recipe, cured for 30 minutes at 307° F. and tested. The compounding recipe is shown in Table VI and the test results are shown in Table VII.

TABLE VI.—SYNTHETIC RUBBER RECIPE

| | Parts by weight |
|---|---|
| SBR [1] | 100 |
| Carbon black | 40 |
| Zinc oxide | 3 |
| BRT #7 [2] | 6 |
| Sulfur | 1.75 |
| Santocure [3] | 0.8 |

[1] An SBR rubber made by the recipe in ASTM D1419-61T.
[2] A refined coal tar product; a nontoxic, dark-colored, viscous liquid with a typical odor, a specific gravity of 1.20–1.25, and an Engler specific viscosity at 100° C. of 6 to 9.
[3] N-cyclohexyl-2-benzothiazole sulfenamide.

TABLE VII.—SBR PROPERTIES

| Carbon black | 1 | 4 | 5 |
|---|---|---|---|
| Processing properties: | | | |
| Compounded ML-4 | 54.4 | 60.0 | 58.8 |
| Scorch, min., 280° F | 15.3 | 14.5 | 19.7 |
| Extrusion at 250° F: | | | |
| Inches/minute | 33.3 | 39.0 | 32.3 |
| Grams/minute | 86.0 | 96.5 | 80.5 |
| Rating (Garvey die) | 10 | 9— | 9— |
| Physical properties (cured 30 minutes at 307° F.): | | | |
| 300% modulus, p.s.i., 80° F | 1,340 | 1,080 | 1,040 |
| Tensile, p.s.i., 80° F | 3,170 | 3,030 | 2,950 |
| Elongation, percent, 80° F | 520 | 560 | 570 |
| ΔT, ° F | 64.5 | 63.8 | 63.1 |
| Resilience, percent | 59.3 | 58.8 | 61.9 |
| Compression set, percent | 22.9 | 20.9 | 31.0 |
| Shore A Hardness | 59.5 | 60.0 | 61.5 |

These data show the reduction in modulus and the increase in scorch time that results from using carbon black of the invention (carbon black 5) in a synthetic rubber.

EXAMPLE V

Carbon blacks 1, 3, 5, 6 and 8 were compounded in a butyl synthetic rubber recipe, cured for 30 minutes and tested. The compounding recipe used is shown in the following Table VIII and the test results are shown in Table IX.

TABLE VIII.—BUTYL RUBBER RECEIPE

| | Parts by weight |
|---|---|
| Butyl rubber [1] | 100 |
| Carbon black | 50 |
| Necton 60 [2] | 5 |
| Stearic acid | 1 |
| Elastopar [3] | 0.25 |
| Zinc oxide | 5 |
| Sulfur | 1 |
| Altax | 1 |
| Methyl tuads [4] | 1 |

[1] An isobutylene-isoprene copolymer having a specific gravity of 0.92.
[2] A mineral oil plasticizer.
[3] N-methyl-N,4-dinitrosoaniline.
[4] Tetramethyl thiuram disulfide.

TABLE IX.—BUTYL RUBBER PROPERTIES

| Carbon black | 1 | 3 | 5 | 6 | 8 |
|---|---|---|---|---|---|
| Porcessing properties: | | | | | |
| Compound ML-4 | 66.6 | 68.8 | 72.6 | 70.0 | 80.0 |
| Scorch, min. 280° F | 11.8 | 11.6 | 11.0 | 11.0 | 11.3 |
| Extrusion at 250° F: | | | | | |
| Inches/minute | 47.5 | 42.2 | 42.2 | 44.5 | 32.7 |
| Grams/minute | 95.0 | 85.5 | 82.5 | 84.0 | 69.5 |
| Rating (Garvey die) | 12 | 12— | 11 | 12— | 8+ |
| Physical properties (cured 30 minutes at 307° F.): | | | | | |
| Compression set, percent | 30.5 | 32.6 | 30.7 | 30.2 | 26.9 |
| 300% modulus, p.s.i., 80° F | 970 | 750 | 620 | 610 | 710 |
| Tensile, p.s.i., 80° F | 2,370 | 2,550 | 2,560 | 2,440 | 2,780 |
| Elongation, percent, 80° F | 625 | 675 | 760 | 710 | 715 |
| Max tensile, p.s.i., 200° F | 1,400 | 1,530 | 1,450 | 1,480 | 1,510 |
| $\Delta T$, ° F | 68.1 | 66.2 | 72.0 | 68.6 | 62.5 |
| Resilience, percent | 50.7 | 52.9 | 52.4 | 50.5 | 55.7 |
| Shore A Hardness | 60.5 | 55.5 | 5.55 | 56.5 | 54.5 |

EXAMPLE VI

Carbon blacks 2, 3 and 5 were compounded with natural rubber in the recipe of Table II, cured for the stated time and tested. Results of the test are shown in Table X.

TABLE X.—RUBBER PROPERTIES

| Carbon black | 2 | 3 | 4 | 5 |
|---|---|---|---|---|
| Physical properties (cured 30 or 40 minutes at 293° F.):[1] | | | | |
| 300% modulus, p.s.i., 80° F | 1,110 | 1,030 | 1,030 | 900 |
| Tensile, p.s.i., 80° F | 2,840 | 3,030 | 3,960 | 3,790 |
| Elongation, percent, 80° F | 560 | 610 | 700 | 690 |
| $\Delta T$, ° F | 40.4 | 35.8 | 43.5 | 41.6 |
| Resilience, percent | 77.2 | 78.9 | 73.9 | 75.9 |
| Shore A Hardness | 56 | 53 | 54 | 52 |

[1] Slabs used in determining the first three properties cured 30 minutes. Pellets used in determing the last three properties cured 40 minutes.

EXAMPLE VII

Carbon blacks 7 and 8 were compounded in a natural rubber recipe, cured 30 minutes at 293° F. and tested. The recipe was that of Table II. The results of tests are shown in Table XI.

TABLE XI.—RUBBER PROPERTIES

| Carbon black | 7 | 8 |
|---|---|---|
| Processing properties: | | |
| Compounded ML-4 at 212° F | 44 | 56 |
| Scorch time (5 point rise): | | |
| Minutes at 250° F | 28.9 | 25.6 |
| Minutes at 280° F | 10.1 | 9.8 |
| Extrusion at 195° F. (Garvey die): | | |
| Inches/minute | 47 | 42 |
| Grams/minute | 83 | 76 |
| Rating | 10— | 10— |
| Physical properties (cured 30 minutes at 293° F.): | | |
| 300% modulus, p.s.i. | 1,340 | 1,310 |
| Tensile, p.s.i. | 4,165 | 4,220 |
| Elongation, percent | 615 | 610 |
| $\Delta T$, ° F | 39.3 | 41.5 |
| Resilience | 79.1 | 76.6 |
| Shore A Hardness | 61.5 | 61 |

EXAMPLE VIII

Carbon blacks 7 and 8 were compounded in an emulsion-polymerized butadiene-styrene synthetic rubber recipe, cured for 30 minutes at 307° F. and tested. The compounding recipe is shown in Table XII and the results of tests are shown in Table XIII.

TABLE XII

| | Parts by weight |
|---|---|
| SBR | 100 |
| Carbon black | 40 |
| Zinc oxide | 3 |
| CP 250 [1] | 6 |
| Sulfur | 1.75 |
| Santocure | 1.0 |

[1] A refined coal tar product similar to BRT #7 except the Engler specific viscosity at 100° C. is 6.5 to 8.5.

TABLE XIII.—RUBBER PROPERTIES

| Carbon black | 7 | 8 |
|---|---|---|
| Processing properties: | | |
| Compounded ML-4 at 212° F | 44 | 45 |
| Scorch (5 pt. rise) min. at 250° F | 16.1 | 16.1 |
| Extrusion at 250° F.: | | |
| Inches/minute | 40 | 40 |
| Grams/minute | 84 | 80 |
| Rating | 8 | 8+ |
| Physical properties (cured 40 minutes a 307°F.): | | |
| 300% modulus, p.s.i. | 810 | 785 |
| Tensile, p.s.i. | 2,780 | 2,900 |
| Elongation, percent | 615 | 640 |
| $\Delta T$, °F | 62.4 | 65.2 |
| Resilience | 68.7 | 66 |
| Shore A Hardness | 62 | 62 |

The above results show the similarity of carbon blacks 7 and 8.

The temperature in an HAF furnace will commonly be about 3000° F. and about 2 to 3 diameters downstream from the tangential flame combustion section (combustion zone 6 of Krejci 3,009,784) and will drop about linearly from that point to the quench at a rate of about 60 to 80° F. per diameter. In order to produce tar-free carbon black, i.e., carbon black having a photelometer of about 90 after pelleting, the reaction is quenced at about 11 diameters downstream from the combustion section. Moving the quench downstream results in aftertreating the black. The extent of aftertreatment can be determined by the rise in photelometer up to 100 (top of the scale) and additional aftertreating can be determined by the increase in surface area in the aftertreating step.

The amount or extent of aftertreatment required to produce the carbon black of the invention will result in a photelometer of at least 100 on the quenched black prior to pelleting or an increase of about 15 to 40 square meters per gram of surface area. Aftertreatment is considered to be a time and temperatuer reaction of water and carbon dioxide on the surface of the black and is an endothermic reaction. Aftertreating is accomplished at temperatures usually above 1000° F. and commonly between 2000 and 2500° F. Even though the reaction is endothermic the temperatures in a carbon black furnace are sufficiently high that there is always sufficient heat available for the aftertreating reaction and therefore the extent of aftertreatment is dependent upon the increase in residence time in the reactor or furnace prior to the quench. Sufficient aftertreating is usually accomplished by moving the quench downstream 8 to 10 diameters or by increasing the diameter of the downstream portion of the reactor so as to increase the volume of the reactor an equivalent amount.

In producing the carbon black of this invention, the operation of the process is substantially the same as that for producing furnace carbon black in the presence of an alkali metal except for the combination of the aftertreating step, including air addition, and the treatment of the black with the oxidizing agent. Thus conventional feedstocks are utilized. Any liquid hydrocarbon that is useful as feedstock for use in a carbon black furnace can be utilized. Aromatic oils such as cycle oils obtained in the catalytic cracking of hydrocarbons are generally preferred because of the quantity and quality of the carbon black produced from them.

The step of treating the black with an oxidizing agent can conveniently be done by adding nitric acid to the pelleting water in the pelleting step or by passing ozone or nitric oxide through a substantially dry bed of loose or pelleted carbon black. The pelleting temperature is usually about 200° F. which is a satisfactory temperature for nitric acid treating. Fluidized bed treating with a gas such as ozonized air can be done at a temperature of about 100 to 250° F. Nitric acid treatment can also be accomplished at temperature in the range of about 100 to 250° F.; however, nitric acid treatment will usually be accomplished during the pelleting step which is ordinarily done at about 200° F.

That which is claimed is:

1. A process for producing carbon black which comprises pyrolytically decomposing a hydrocarbon to form carbon black in the presence of about 2 to 10,000 parts by weight of an alkali metal per million parts by weight of carbon black produced, said alkali metal having an atomic number of at least 19, aftertreating the carbon black in the presence of air to increase the surface area of the black from about 15 to about 40 square meters per gram higher than its surafce area at a photelometer of 90, and cooling and recovering the carbon black.

2. The process as defined in claim 1 in which the cooled carbon black is pelleted in the presence of an oxidizing agent.

3. The process of claim 2 in which the alkali metal is potassium.

4. The process of claim 2 in which pelleting in the presence of an oxidizing agent lowers the pH of the black to below about 4.

5. The process of claim 2 in which the oxidizing agent is selected from the group consisting of nitric acid, ozone and oxides of nitrogen.

6. The process as defined in claim 2 in which air for aftertreating is introduced into contact with the carbon black in the reaction chamber prior to quenching.

7. The process as defined in claim 2 in which the oxidizing agent is an aqueous solution of about 5 weight percent nitric acid.

8. The process as defined in claim 2 in which the oxidizing agent is ozonized air, said ozone being employed in amount of about 1.7 pounds per 100 pounds of carbon black.

References Cited

UNITED STATES PATENTS

| | | | |
|---|---|---|---|
| 3,009,784 | 11/1961 | Krejci | 23—209.4 |
| 3,247,003 | 4/1966 | Pollock | 106—307 |
| 3,250,634 | 5/1966 | Kraus et al. | 106—307 |
| 3,301,694 | 1/1967 | Kraus et al. | 106—307 |
| 3,306,761 | 2/1967 | Johnson | 106—307 |
| 3,307,911 | 3/1967 | Krejci | 23—209.4 |

TOBIAS E. LEVOW, Primary Examiner

H. M. S. SNEED, Assistant Examiner

U.S. Cl. X.R.

23—209.4